May 27, 1924.
T. W. C. HARTMANN
1,495,480
SHOCK ABSORBING DEVICE FOR VEHICLES
Filed Oct. 19, 1920
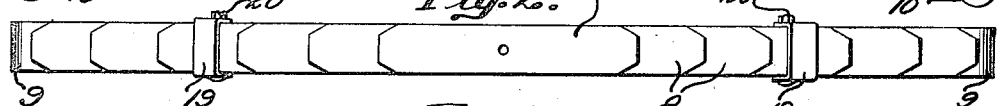
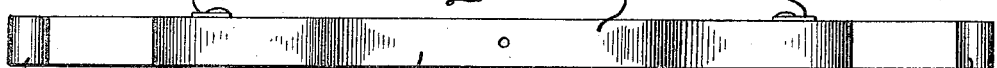
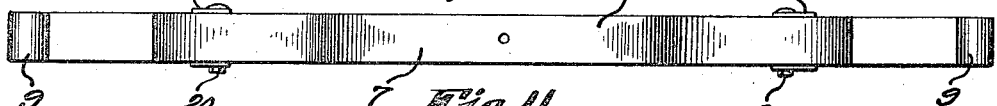
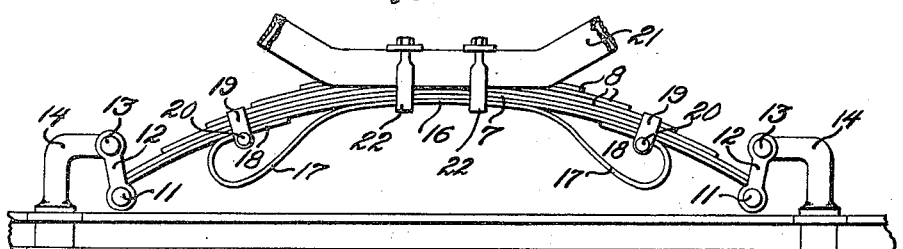
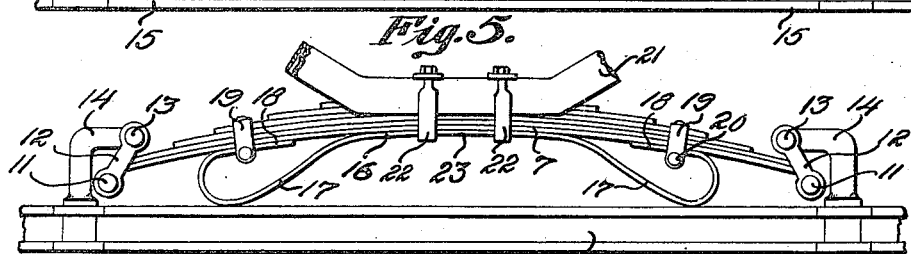
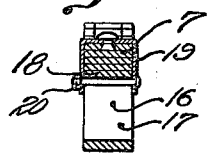
Witnesses
Geo. A. Gruss
Augustus B. Coppes
Inventor
Thomas W. C. Hartmann
By Joshua R. H. Potts
his Attorney Patented May 27, 1924.

1,495,480

UNITED STATES PATENT OFFICE.

THOMAS W. C. HARTMANN, OF PHILADELPHIA, PENNSYLVANIA.

SHOCK-ABSORBING DEVICE FOR VEHICLES.

Application filed October 19, 1920. Serial No. 417,887.

*To all whom it may concern:*

Be it known that I, THOMAS W. C. HARTMANN, a citizen of the United States, residing at Philadelphia, in the county of Philadelphia and State of Pennsylvania, have invented certain new and useful Improvements in Shock-Absorbing Devices for Vehicles, of which the following is a specification.

One object of my invention is to provide a shock absorbing device of a simple and durable construction for the purpose of resiliently supporting the body of a vehicle on the frame or chassis and which will be of particular advantage as a spring support and strengthening device on the front of automobiles of the "Ford" type or other type in which the body-supporting leaf spring is directly over the front axle.

It is well known that leaf springs as above described often break due to the striking of the springs against the axle when the body portion is heavy and receives a jolt while traveling along a roadway or when the vehicle is making a turn.

Another object of my present invention is to so make my improved device that it will prevent, to a great extent, the breaking of springs as above described and will more firmly and adequately support the body of a vehicle than heretofore possible.

These objects, and other advantageous ends which will be described hereinafter, I attain in the following manner, reference being had to the accompanying drawings in which—

Figure 1 is a front elevation illustrating my invention in connection with a leaf spring of the bowed or semi-elliptic type, Figure 2 is a top plan view of Figure 1, Figure 3 is an inverted plan view of Figure 1, Figure 4 is a fragmentary elevation showing my invention in a normal position when attached to a vehicle, Figure 5 is a view of the same general character as that shown in Figure 4 illustrating the body portion having moved downwardly so as to cause my improved shock absorbing device to engage the axle of the vehicle, and Figure 6 is a cross section taken on the line 6—6 of Figure 1.

Referring to the drawings, 7 represents a bowed leaf spring which is made up of a number of leaves or laminations 8 of various lengths which can be made in the usual manner; certain of the leaves including portions 9 turned in the form of eyelets which are preferably provided with bushings 10 through which the pivot bolts 11 pass as shown in Figures 4 and 5. These pivot bolts 11 are mounted in swinging links or hangers 12 which at their upper ends are pivoted at 13 to brackets 14 extending upwardly from the front axle 15 of a vehicle.

To the spring, 7 I attach a device 16 which is preferably made of a strip of resilient metal such as spring steel preferably of the width of the leaves 8 of the spring 7. This device 16 has its opposite end portions bent to provide two depending loops 17 which are located inwardly from the opposite ends of the spring 7. The extreme end portions 18 of the device 16 extend substantially parallel and in engagement with the under surface of the lower leaf 8 of the spring 7. Clips 19 embrace certain of the leaves 8 of the spring 7 and also embrace the sides of the end portions 18 of the device 16. Bolts 20 extend through the clips 19 and under the end portions 18 of the device 16 and thus hold the leaves of the spring and the device 16 in alignment so that the spring 7 and device 16 are immediately over the axle or beam 15 of the vehicle frame or chassis.

A supporting channel 21, which may be considered to be a part of the body portion of a vehicle, partly embraces the top portion of the spring 7 and two clips 22 are connected to the part 21 and extend under the part 23 of the device 16 which leads upwardly from the loops 17 and which provides the connecting part for the loops 17. It will be understood that the loops 17 of the device 16 are normally spaced with their bottom portions above the axle 15 as shown in Figure 4 and during the normal movement of the vehicle, the loops 17 will not engage the axle 15. However, even under normal conditions, the loops 17 of the device 16 greatly strengthen the spring 7 adjacent its ends without greatly adding to the weight of the spring. If during the movement of the vehicle a sudden jolt causes the body portion to move downwardly the loops 17 will resist said downward movement in conjunction with the resistance caused by the spring and usually the combined resistance of the loops 17 and of the spring is sufficient to prevent the downward movement of the loop 17 into contact with the axle 15. If, however, the jolt is extremely severe, the loops 17 will be moved downwardly into engagement with the axle 15 and will act directly as shock absorbers and cushioning means to prevent further downward movement of the spring itself. When the looped portions 17 engage the axle they immediately strengthen the portions of the springs adjacent the end portions and thereby prevent these portions of the springs from breaking as is common occurrence with springs of this type without my invention thereon.

The looped portions 17 also serve as strengthening and shock absorbing means effective when the vehicle is making a turn and thus causing an abrupt lateral shifting movement between the body portion and the frame since the parts of the spring 7 receive the greatest thrust adjacent the end portions of the spring and the loops 17 are capable of resiliently resisting this lateral shifting movement and thereby protect the spring against fracture.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination in a vehicle of a bowed spring for supporting a body portion, an axle extending in the direction of the length of and below the spring, and a shock absorbing device consisting of a leaf spring centrally connected with the under side of the bowed spring, having its ends looped and engaging with the bowed spring between its center and ends and adapted, upon compression of the bowed spring, to move downwardly and engage the axle.

2. The combination in a vehicle of a bowed spring for supporting a body portion, an axle extending in the direction of the length of and below the spring, and a shock absorbing device consisting of a leaf spring centrally connected with the under side of the bowed spring, having its ends looped and connected with the bowed spring between its center and ends and adapted, upon compression of the bowed spring, to move downwardly and engage the axle.

In testimony whereof I have signed my name to this specification in the presence of two subscribing witnesses.

THOMAS W. C. HARTMANN.

Witnesses:
ELIZABETH GARBE,
CHAS. E. POTTS.